May 4, 1948. A. R. YGLESIAS-PAZ 2,440,884
GRAVITY FLOW TYPE DRIER FOR COFFEE BEANS HAVING MATERIAL
FEEDING AND DISCHARGE CONTROL
Filed May 1, 1944 11 Sheets-Sheet 10

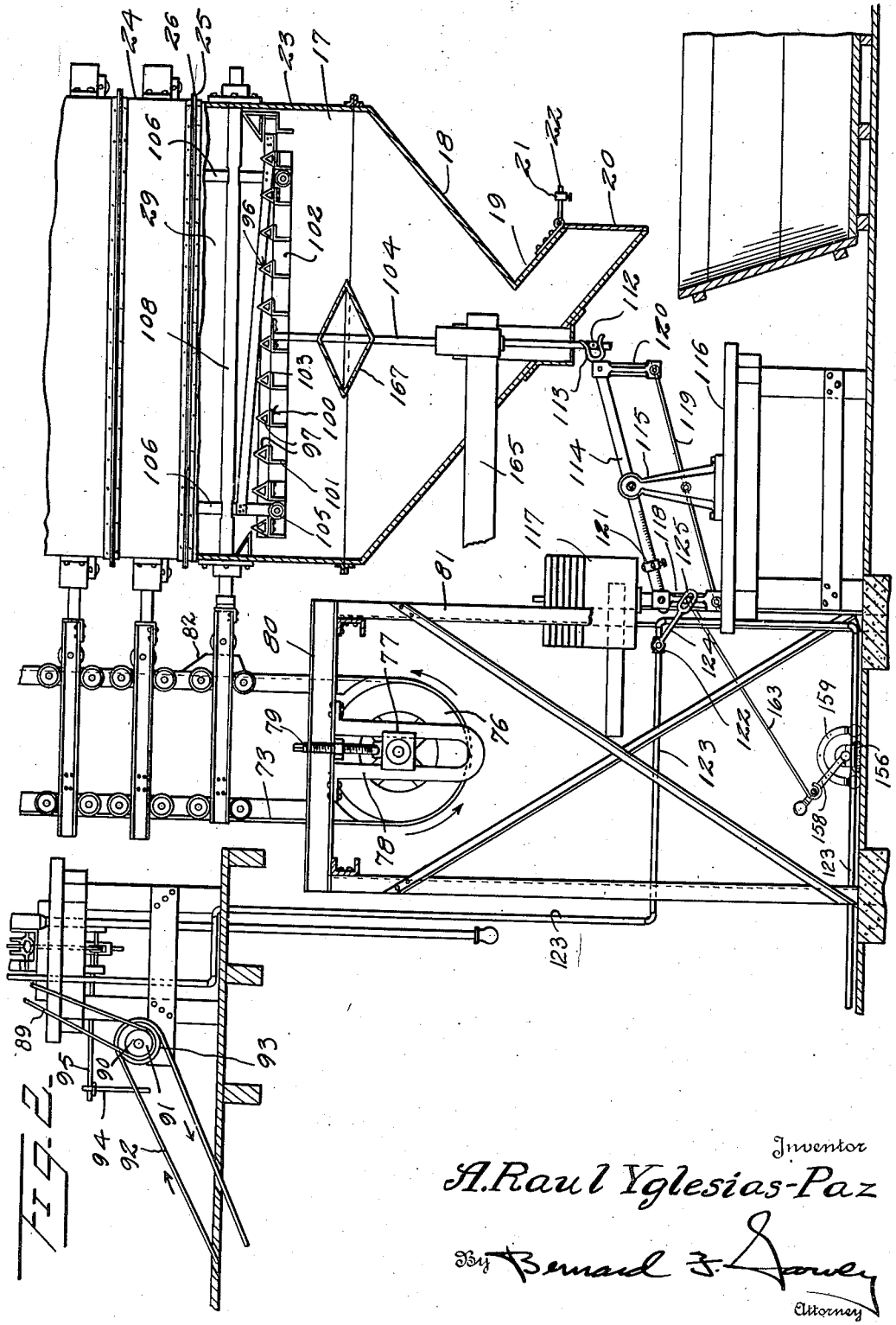

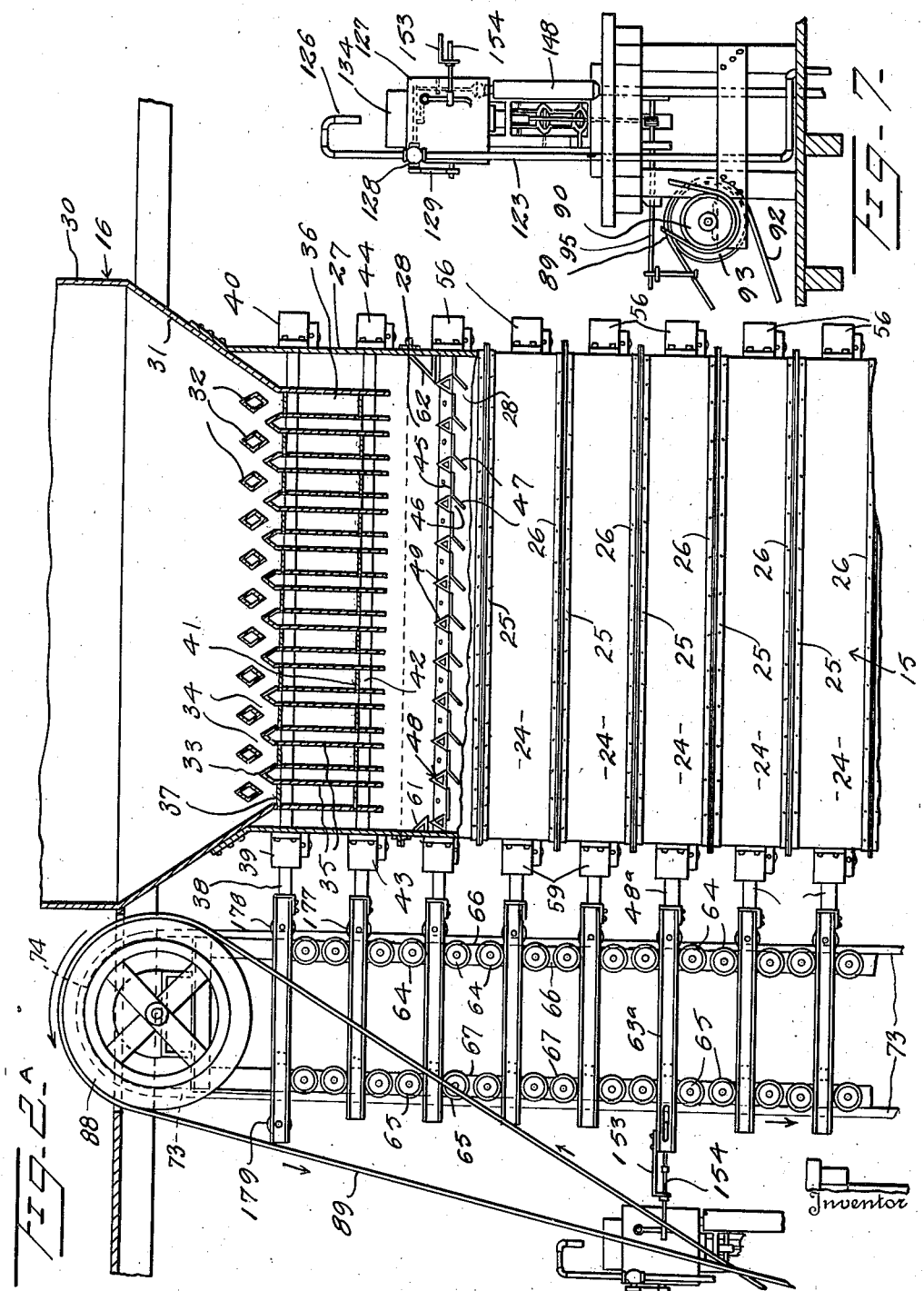

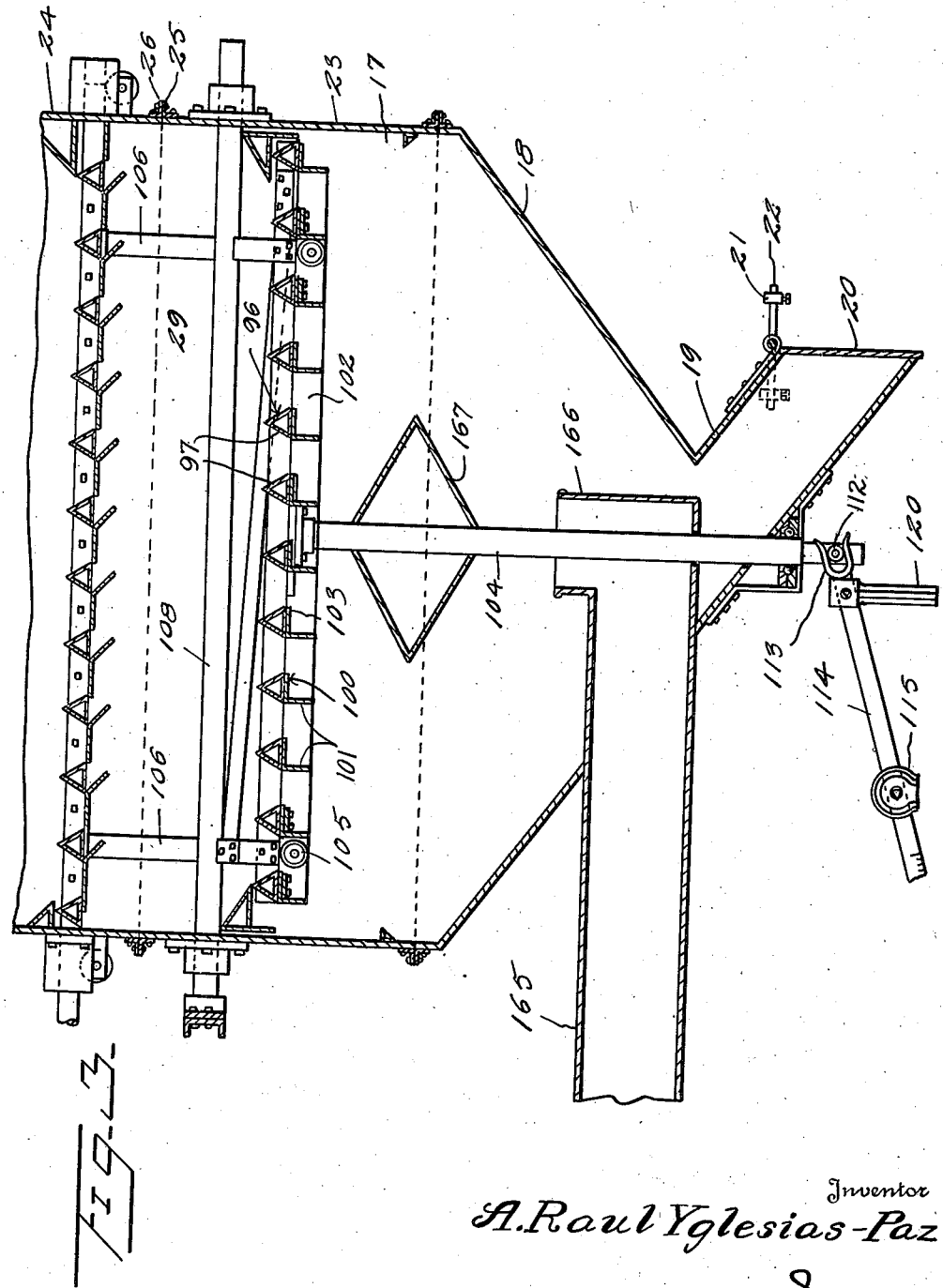

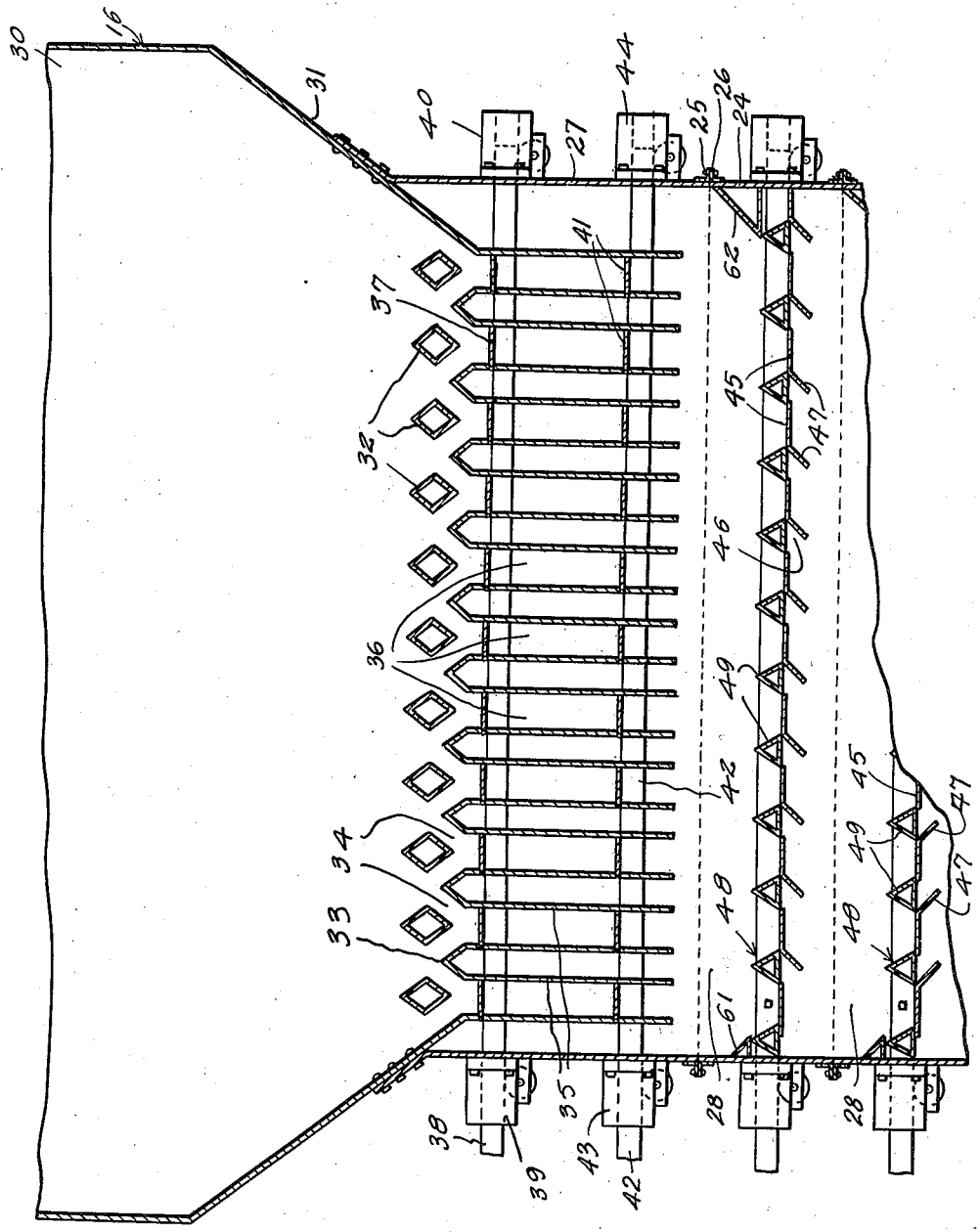

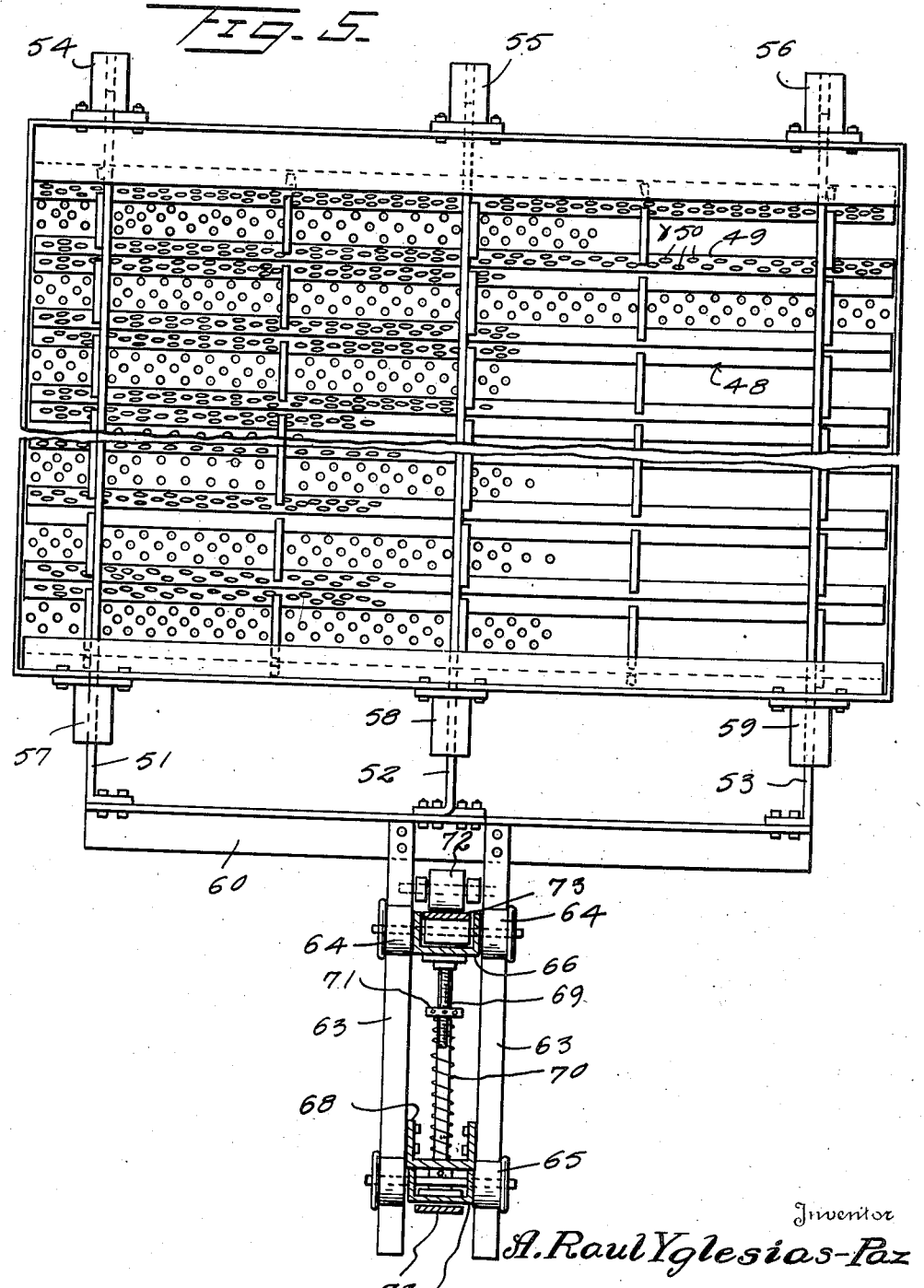

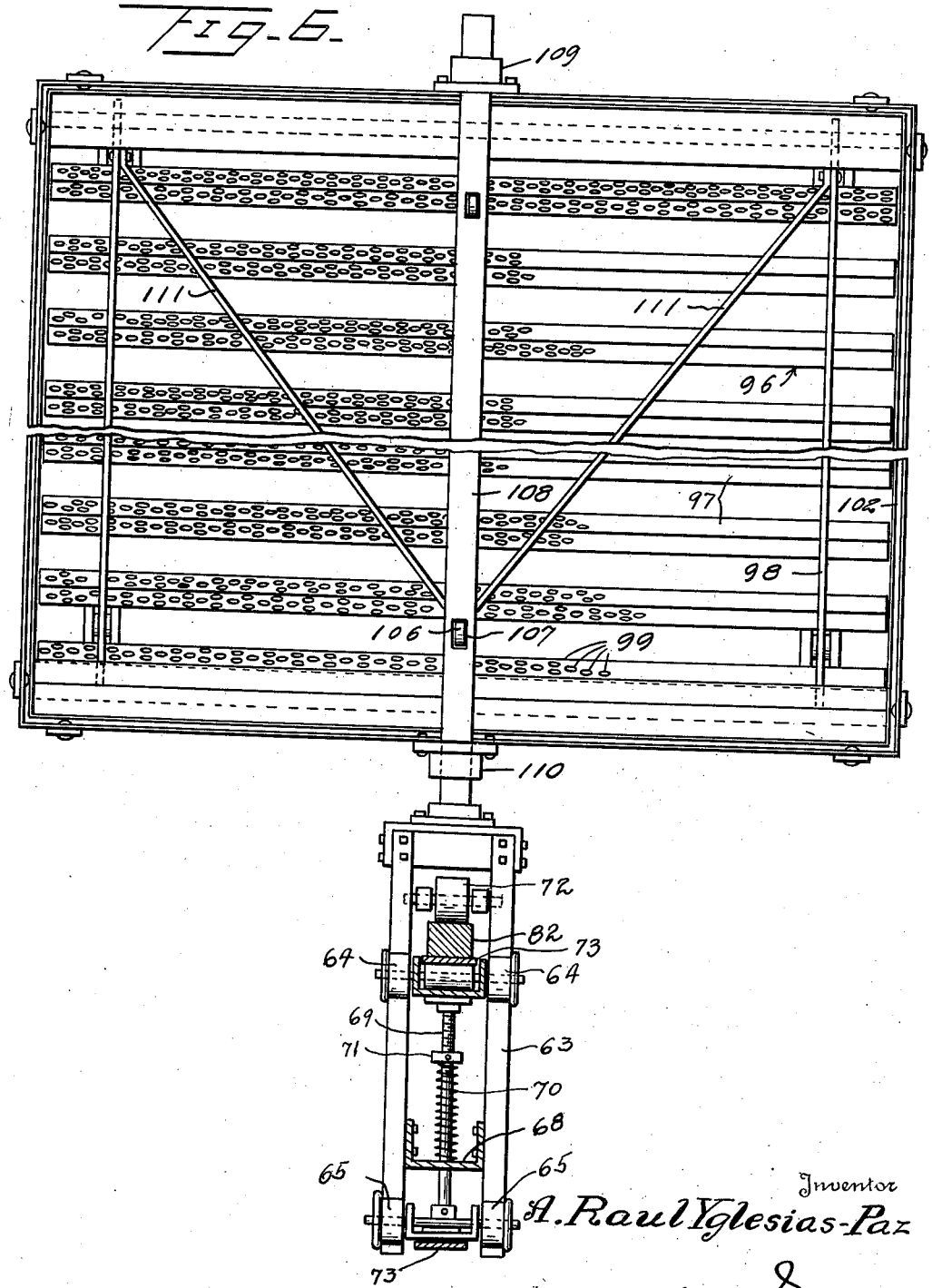

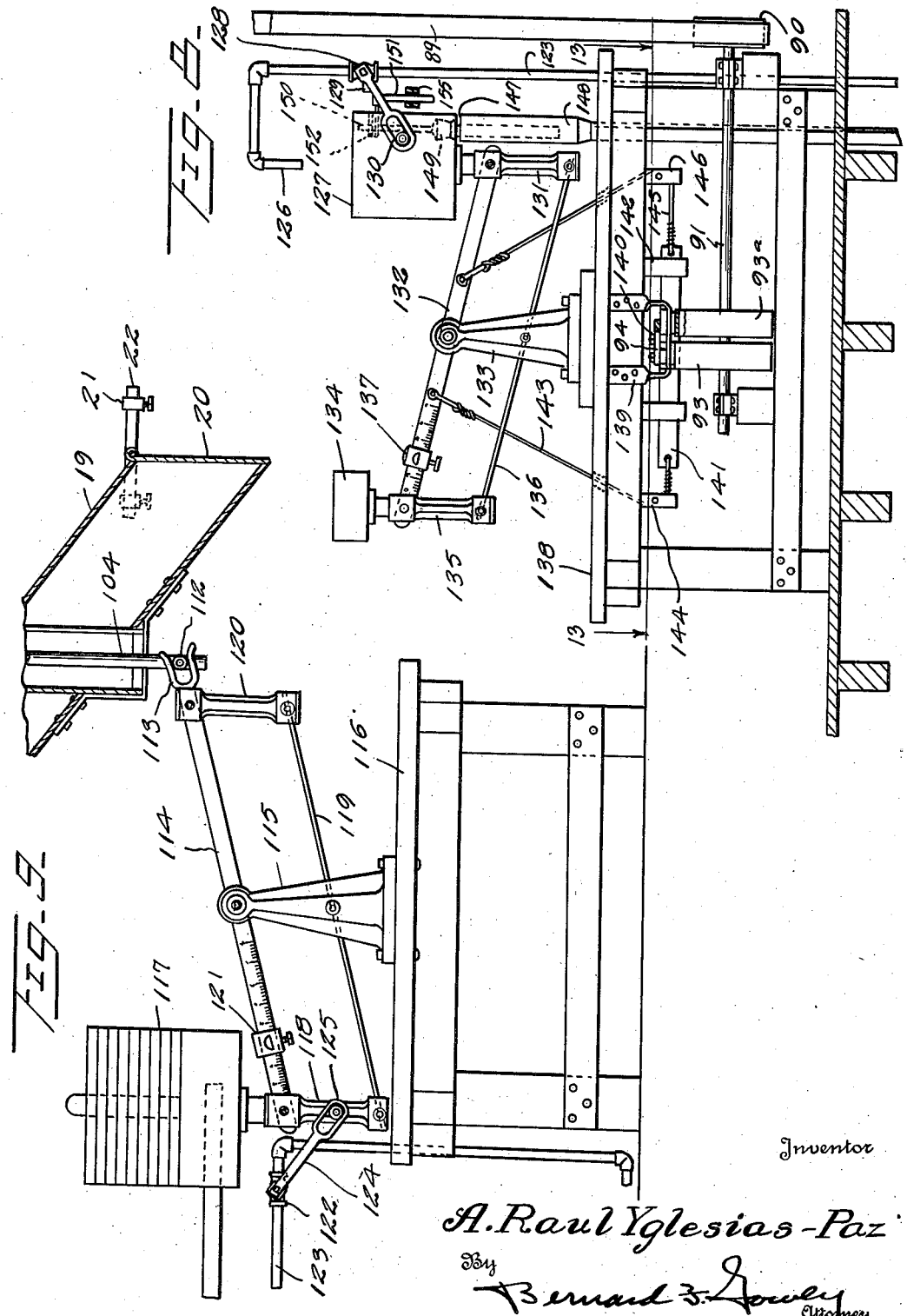

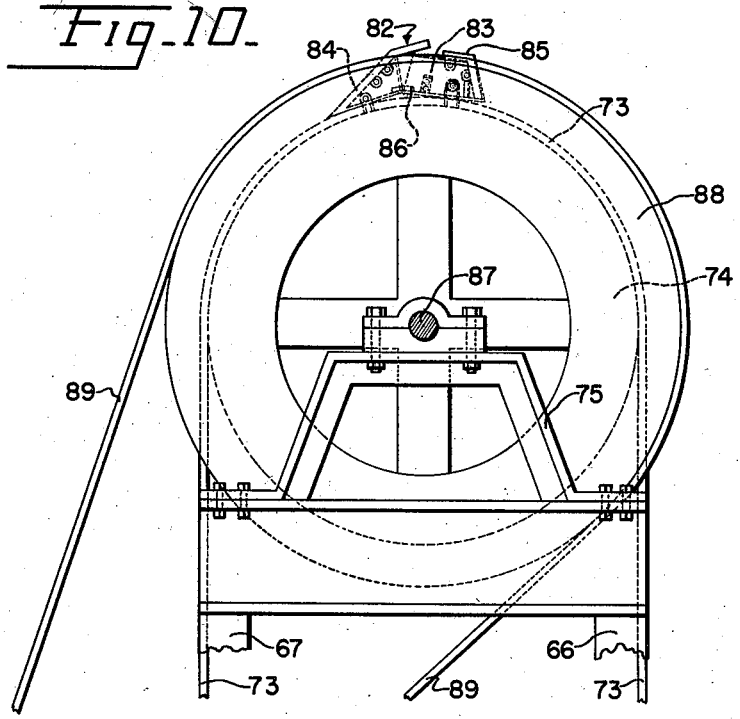
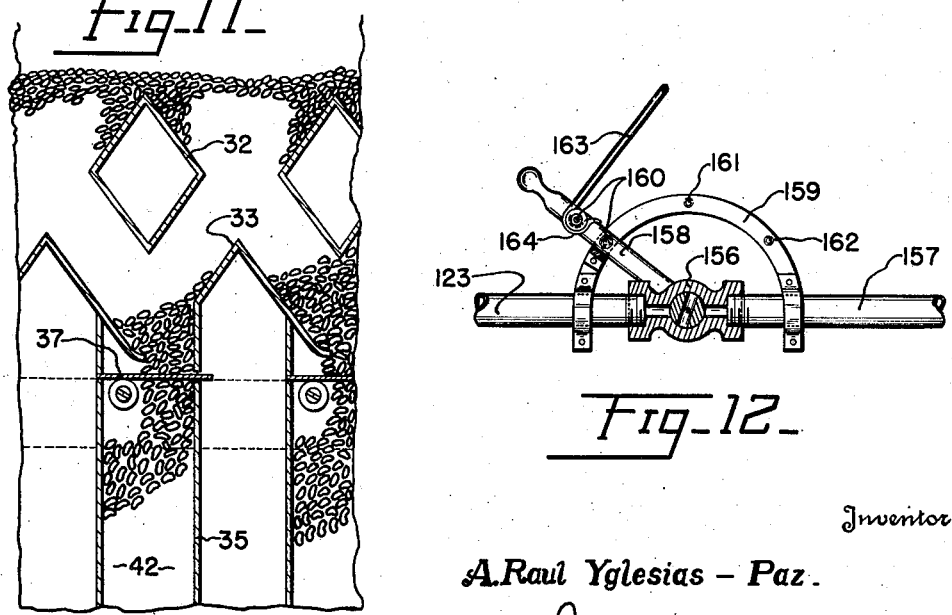

Inventor.
A. Raul Yglesias-Paz
By Harvey O'Connell
Attorneys

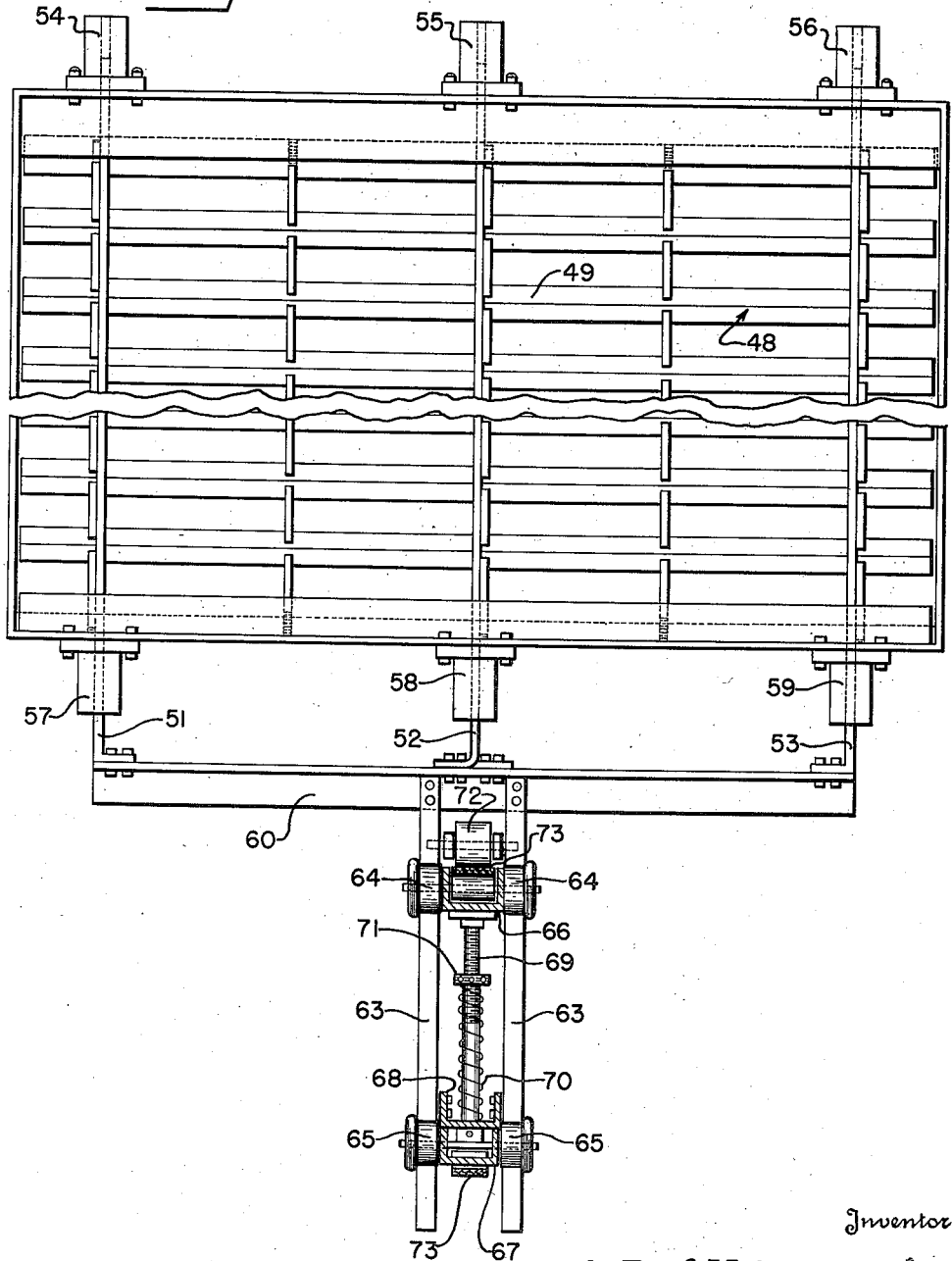

Patented May 4, 1948

2,440,884

UNITED STATES PATENT OFFICE 2,440,884

GRAVITY FLOW TYPE DRIER FOR COFFEE BEANS, HAVING MATERIAL FEEDING AND DISCHARGE CONTROL

Adolfo Raul Yglesias-Paz, Guatemala City, Guatemala

Application May 1, 1944, Serial No. 533,617

5 Claims. (Cl. 34—56)

This invention relates to an improved drier for drying coffee beans.

An object of this invention is to provide a coffee bean drier which is designed for large production, automatic in operation, and will operate continuously, and will need only a single operator therefor.

Another object of this invention is to provide a drier of this kind embodying the use of heated air which passes through the device in counter-current to the movement of the beans therethrough, the beans dropping by gravity from the initial compartment in measured quantities and contacting the heated air at higher temperatures as the beans approach the discharge end of the device.

A further object of this invention is to provide in a device of this kind an automatically operable means for effecting movement of the beans through the device so that the beans will leave the drier in a predetermined dried condition. In practice, the automatic regulator for moving the material through the device operates by means of a counterweight which is active when a predetermined quantity of coffee beans has lost weight by drying of the moisture therein, so that the beans will remain in the drying chambers until they are dried to the predetermined degree.

Another object of this invention is to provide in a device of this kind means for progressively passing the coffee beans through the drying chambers, the means for releasing the beans from one chamber to another being in the form of a movable releasing trigger which opens the bottom walls of the chambers so that the beans from one chamber will progress to the succeeding chamber until the beans finally enter the lowermost chamber, from which the beans are discharged into a receiving hopper.

A further object of this invention is to provide in a device of this kind an improved movable bottom wall for a plurality of superposed drying chambers, the bottom wall being so shaped as to provide for the complete discharge of the beans in such chambers and also the agitation of the beans as they are discharged from one chamber to another.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a detailed side elevation of a coffee bean drier constructed according to an embodiment of this invention.

Figure 2 is a fragmentary vertical section of the lower portion of the device.

Figure 2A is a fragmentary vertical section of the upper portion of the device.

Figure 3 is an enlarged vertical section of the lower end of the device including the receiving hopper.

Figure 4 is an enlarged fragmentary vertical section of the upper portion of the device.

Figure 5 is a plan view, partly in section, of one of the combined bottom wall forming end valve members for the drying chambers, showing the device in closed position.

Figure 6 is a plan view of the lowermost of the valve members.

Figure 7 is a fragmentary end elevation, partly in section, of the balanced regulator for controlling the operation of the operator for the movable valves.

Figure 8 is a detailed side elevation of the balanced regulator shown in Figure 7.

Figure 9 is a fragmentary side elevation of the balanced discharge regulator for the receiving hopper in the lower end of the device.

Figure 10 is a fragmentary side elevation, partly in section, of the endless operator for the valves.

Figures 11 is a fragmentary enlarged vertical section of the distributor and lower portion of the upper hopper.

Figure 12 is a fragmentary view in elevation, and partly in section, of the valve used in discharge of water into the balanced valve regulator.

Figure 14 is a plan view of the intermediate valve which does not have perforations for the passage of drying air.

Figure 1:
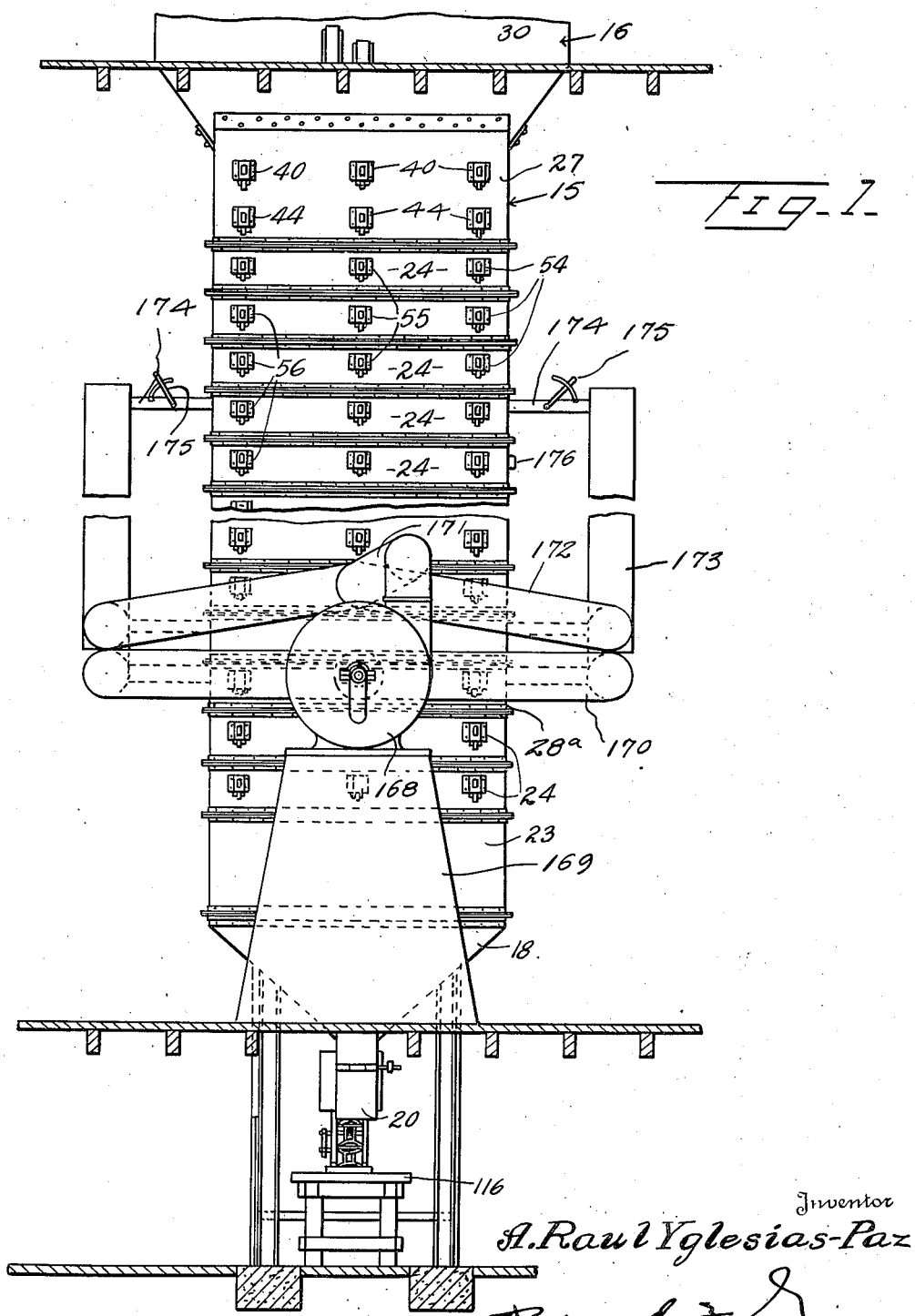
Figure 13:
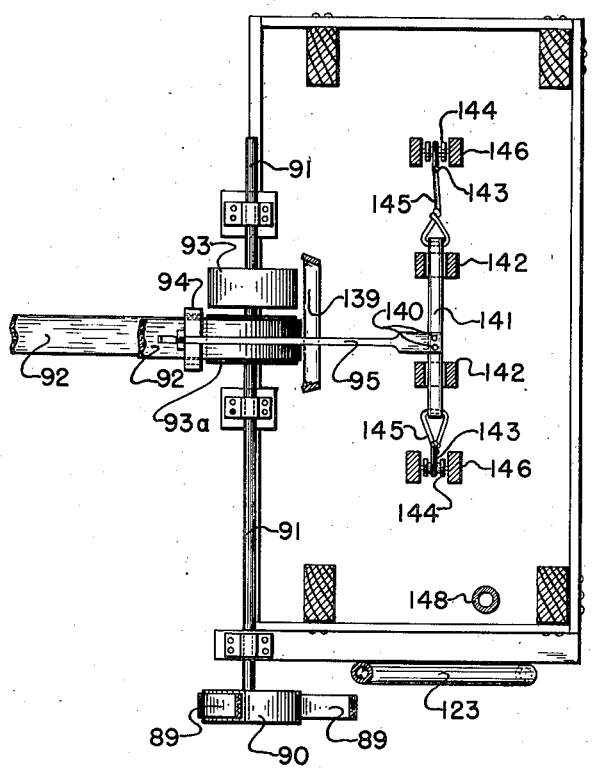
Figure 13 is a sectional plan view taken on the line 13—13 of Figure 8 showing the belt shifter.

Referring to the drawings and first to Figure 1, the numeral 15 designates generally a tower which is formed of a series of superposed drying chambers, and the numeral 16 designates a receiving hopper at the upper end of the tower wherein the coffee beans are initially discharged.

The tower 15, as shown in Figures 2 and 2A, includes a lower delivery chamber or hopper 17, which is formed with a substantially conical bottom wall 18, having a delivery pipe or nipple 19 extending from the apex thereof. The lower end of the delivery member 19 is normally closed by means of a pivoted closure 20 which is held in closed position by means of an adjustable weight 21 carried by an arm 22 fixed to the closure 20 and extended angularly therefrom.

The tower 15 is of substantially rectangular configuration, being constructed from a series of rectangular members 23, 24 and 27, which are formed with flanges 25 and 26 secured together in any suitable manner, and in practice there are a number of the rectangular members 24 disposed in axial alignment, and each rectangular member 24 defines a drying chamber, as will be hereinafter described.

A rectangular wall 27 is secured to the uppermost of the rectangular members 24 and defines a measuring chamber wherein the beans are initially discharged from the receiving hopper 16, and subsequently discharged to the first or uppermost drying chamber. The drying chambers are designated by the numeral 28 and there may be as many of these drying chambers as may be desired between the measuring chamber 27 and the lowermost drying chamber 29.

The receiving hopper 16 includes a rectangular wall 30 having a downwardly tapered bottom wall 31, which is truncated at its lower end, and a plurality of diamond-shaped spreader bars 32 are secured in parallel relation across the lower portion of the wall 31. A plurality of substantially inverted V-shaped bars 33 are disposed below and between each pair of the bars 32, thereby forming irregular channels 34 through which the coffee beans are adapted to pass.

The inverted V-shaped bars 33 have formed with the divergent sides thereof depending guide channel forming walls 35, thereby forming measuring chambers 36 below the diamond bars 32. The coffee beans are held against dropping into the measuring chambers 36 by means of movable valve plates 37, which are secured to an elongated rod 38. The rod 38 is movably supported in bearings 39 and 40 disposed exteriorly of the rectangular member 27, and in closed position the valve members 37 will be disposed between adjacent pairs of the depending walls 35.

A second series of valve members 41 is disposed below the valve members 37, thereby forming a substantial measuring chamber 36, and the valve members 41 are secured to a horizontally sliding supporting rod or shaft 42, positioned below the rod or shaft 38. The shaft 42 is slidable in bearings 43 and 44, and normally the valve members 42 will be in closed position as shown in Figures 2A and 4.

The drying chamber 28, immediately below the measuring chambers 36, includes a bottom wall or plate 45 which is perforated so as to permit the passage of air therethrough, the perforations being smaller in size than the coffee beans so that the beans will not drop through the perforations. The plate 45 is provided with a plurality of parallel openings 46, and a plurality of downwardly inclined guide plates 47 extend from the plate 45 at an obtuse angle from the latter plate. The openings 46 in the bottom wall plate 45 are adapted to be normally closed by means of a slidable valve structure, generally designated as 48.

In Figures 5 and 6, the valve member 48 is shown in closed and open position respectively. The valve member 48 is formed of a plurality of spaced apart parallel triangularly shaped bars 49 which are formed with a plurality of openings or perforations 50, whereby air may pass through the bars from one drying chamber to another, and the triangular bars 49 are secured to elongated slide bars 51, 52, and 53. The slide bars 51, 52, and 53 slidably engage in guides 54, 55, and 56 respectively, at one side of the tower 15, and also slidably engage in guides 57, 58, and 59 respectively, carried by the opposite side of the tower 15. The slide bars 51, 52, and 53 are connected together at one end thereof by means of a connecting bar 60.

A V-shaped baffle 61 is secured to the inner side of the hopper at one end of the valve member 48, and a second V-shaped baffle 62 is secured to the opposite inner side of the tower 15, so that the beans will be prevented from engaging on the outer sides of the outermost of the triangular bars 49 and being crushed thereby as the valve member 48 is moved to open or closed position.

The connecting bar 60 has secured thereto a pair of parallel spaced apart rails 63 which movably engage between pairs of rollers 64 and 65. The rollers 64 are secured to a vertical beam or column 66, and the rollers 65 are secured to a second vertical beam 67, spaced outwardly from the beam 66. The two rails 63 are connected together by means of a U-shaped connector 68, and a horizontal rod 69 is secured between the two beams 66 and 67 as shown in Figure 5, the connecting member 68 sliding along the rod 69.

A spring 70 is disposed about the rod 69, bearing at one end against the connector 68 and at the other end against a collar 71, adjustable along the length of the rod 69 so that the spring 70 may be tensioned to the desired degree. The various valve members which are disposed one in each drying chamber 28 are of identical construction, and each includes the rails 63 and the spring 70 whereby each valve member will be normally urged to closed position.

A roller 72 is journaled between the rails 63 inwardly from the innermost rollers 64, and is adapted to engage against one side of an endless belt 73. The belt 73 is trained about an upper wheel 74 carried by a support 75 mounted on the upper ends of the beams 66 and 67, and also trained about a lower wheel 76 rotatably carried by a vertically adjustable bearing 77. The bearing 77 is vertically adjustable in a guide 78, the bearing 77 being movable downwardly to tension the belt 73 by means of a belt tightening screw 79. The bearing support 78, or guide, is carried by a horizontal beam 80 secured to the upper end of a supporting frame 81.

The belt 73 has secured thereto a wedge shaped valve operator 82 which, as shown in Figure 10, is formed of a body 83 having hingedly secured thereto a plate 84. The plate 84 is inclined inwardly from the outer side 85 of the body 83, and terminates at its inner end substantially at the outer surface of the belt 73, so that as the wedge 82 moved upwardly on the inner run of the belt, the inclined plate 84 will engage the roller 72 of a valve, and move this roller inwardly toward the tower, thereby shifting the correlated valve 48 to open position. The wedge 82 has the plate 84 thereof hinged as at 86 to the body 83 so that the wedge may be made of suitable length to maintain each valve member in open position for a period of time sufficient to permit the discharge by gravity of the beans from one chamber to another.

The hinging of the two portions of the wedge provides a means whereby the wedge may readily pass about the periphery of the two wheels 74 and 76. The plate 85 of the wedge body 83 is of such length as to maintain the engaged valve member 48 in open position for the desired length of time. The upper wheel 74 is mounted on a shaft 87 and a second wheel 88 is secured to the shaft 87, and has trained thereabout a belt or flexible driving member 89. The driving member 89 is also trained about a pulley or wheel 90 carried by a shaft 91 disposed below the wheel 88 and shown in Figure 2. The shaft 91 has mounted thereon a pair of pulleys 93 and 93a, one of which, 93a, is an idler pulley and the other, 93, fixed to the shaft 91, and a driving belt 92 is adapted to be selectively trained about the idler pulley 93, and about power pulley 93a. The driving belt 92 is driven from a remote power source (not shown).

The driving belt 92 is adapted to be shifted to the driving pulley 93 or idler pulley 93a by means of a belt shifter 94 mounted on a slidable shaft 95.

The tower 15 has mounted in the lower drying chamber 29 thereof a lower valve member 96 which is formed of a plurality of parallel spaced apart triangular bars 97. The bars 97 are secured to a pair of parallel bars 98, as shown in Figure 6, and are perforated as at 99 so as to permit the hot air to pass upwardly therethrough when the valve members 97 are in closed position.

A lower chamber bottom wall structure, generally designated as 100, is adapted to engage the bases of the bars 97, and right-angularly disposed depending plates or guides 101 extend from the plates or bottom members 100. The bottom wall structure 100 includes a substantially rectangular frame 102, which is secured to the outer portions of the depending members 101, and the end portions of the horizontal portions 103, and the frame 102 is secured to the upper end of a vertically shiftable shaft 104.

The bars 98 engage pairs of rollers 105 carried by the bottom frame structure 100, so that the bars 98 may be shifted endwise when the lower valve 96 is moved to open or closed position. A pair of vertically disposed bars 106 is secured to the valve member 96, and slidingly engages through openings 107 formed in a valve operating shaft 108 slidable in bearings 109 and 110, carried by the tower 15. The shaft 108 is disposed above the valve member 96 and preferably a pair of divergent bracing members 111 are connected to the bars 98 adjacent one end thereof, and connected to the rearmost of the vertical slide bars 106.

The valve member 96, together with the bottom wall structure 100, is adapted to be raised or lowered when the valve member 96 is in closed position by means of a gravity operated balance structure as will be hereinafter described. The shaft 104 has mounted on the lower end thereof a roller 112, which is engaged by a fork 113 carried by a balance lever 114. The balance lever 114 is pivotally mounted on a support 115 carried by a base 116, and the lever 114, at the end thereof opposite from the fork 113, has pivotally mounted thereon a weight 117. The weight 117 is preferably mounted on a pivoted support 118 which is pivoted to the lever 114, and the weight 117 is held in a vertical position by means of a rod 119 pivotally connected at its ends to the lower ends of support 118 and depending arm 12, and at its center to support 115. The lever 114 has adjustable along the length thereof an adjustable weight 121, so that the balance of the lever 114 can be finally regulated. The mounting of the lower valve member 96 and the bottom wall structure 100 for vertical movement under the control of the balance structure is provided in order that the beans in the spaces between the triangular bars 97 will not be discharged into the delivery hopper 17 until the beans have been relieved of the desired amount of moisture. The vertical movement of the lever 114 regulates the opening and closing of a valve 122, which is interposed in a water supply pipe 123. The valve 122 includes a slotted arm 124 which engages a pin 125 carried by the weight supporting member 118, so that vertical movement of the support 118 with movement of the lever 114 will either open or close the valve 122, and thereby regulate the opening or closing of the valve members 48 and 96 as will be hereinafter described.

The pipe 123 is connected at one end to a source of water supply, and at the other end is provided with a discharge nozzle 126 positioned above a vertically shiftable tank 127. A valve 128 is interposed in the pipe 123 adjacent the tank 127, and has a slotted lever 129 secured thereto which is engaged by a pin 130 carried by the tank 127 so that vertical movement of the tank 127 will open or close the valve 128. The tank 127 is mounted on a vertically disposed arm 131 carried by one end of a balance lever 132 which is rockably mounted on a support 133. The tank 127 is maintained in an upright position by means of a rod 136 pivotally connected at its ends to the lower ends of depending arms 131 and 135 and at its center to support 133.

The tank 127 has a discharge pipe 147 connected to the bottom thereof, which is slidably positioned in a drain pipe 148. The upper or inner end of the discharge pipe 147 is adapted to be closed by a ball valve 149 having a stem 150 secured thereto extending upwardly into the tank 127. A bell crank lever 151 is rockably carried by the tank 127 and engages a collar 152 mounted on the stem 130, so that rocking of the lever 151 will effect raising of the valve 149 and thereby drain the water or liquid into the drain pipe 148. Upon draining of the water or liquid from the tank 127, the weight 134 will raise the tank 127 thereby moving the lever 129 to valve opening position. The lever 151 is operated by movement of one of the intermediate valve members to open position, this intermediate valve member being designated by the numeral 48A, and the rails 63A have connected thereto a supporting arm 153 which has adjustably secured thereto a threaded eyebolt 154, the eye 135 of which slidingly engages one arm of the bell crank 151.

Arranged in the water feed pipe 123, and located therein in advance of valve 122, is a control valve 156. The operating lever 158 of valve 156 is movable across a quadrant 159 provided with valve indicating positions 160, 161 and 162. When in either of the extreme positions, 160, 162, the valve is closed to prevent the passage of water through the conduit 123. When the lever 158 is in the vertical or intermediate position, valve 156 is open to permit the passage of water from the source of supply through conduit 123. Valve lever 158 has an adjustable link connection 163 with a pin 125 carried by the aforementioned pendant 118 so that valve 156 will operate in response to the pivotal movement of lever 114.

The purpose and function of valve 156 will be apparent from the following: Each time lever 114 is caused to swing in a clockwise direction in response to the weight of the beans, valve 122 is moved to closed position by reason of the pin and slot connection 125, 124 between pendant 118 and valve 122. At the same time motion is transmitted through the link 163 to the valve lever 158 for moving the latter to the intermediate position 161, thereby opening valve 156. As the weight of the beans decreases due to dryness, counterweights 117 will then cause lever 114 to swing in an opposite direction for effecting an opening of valve 122 without disturbing the open position of valve 156. With both valves 156 and 122 being now open, water will then flow through the conduit 123 and through valve 128 into tank 127 until the latter is full. When tank 127 becomes full, rod 129 will be actuated to effect a closing of valve 128, while at the same time driving belt 92 will be shifted from the idler pulley 93a to the driving pulley 93, thus setting the entire mechanism in operation for effecting a transfer of the beans from one chamber to the next succeeding lower chamber. When this has been effected, the parts will then be in position to repeat the cycle of operation just described.

The tower is adapted to be heated by a forced draft of air which initially enters the lower delivery chamber 18 through an intake pipe 165 which is connected at one end to a suitable source of air heating means, and extends into the chamber 18 and is formed with a vertically disposed discharge end 166 discharging the hot air into the central portion of the chamber 18. The vertically shiftable rod or shaft 164 slidingly engages through the center of the discharge member 166, and the shaft 164 has mounted thereon a double conical deflector 167 for deflecting the hot air to the outer portions of the chamber 18. A blower or fan 168 is mounted on a support 169 at one side of the lower portion of the tower 15, and has the suction side thereof connected to an intermediate chamber 28A. The chamber 28A is identical with the chambers 28 with the exception that the bottom wall thereof and the sliding valve are imperforate, as shown in Figure 14, so that when correlated valve in the chamber 28A is in closed position, the air will not be able to rise above the chamber 28A. The suction side of the blower 168 is connected to the chamber 28A by means of a pipe 170 which may be connected to a plurality of spaced points about the chamber 28A, as shown in Figure 1. The outlet or discharge side of the blower 168 has connected thereto a pipe 171 which is connected to a manifold 172 extending to opposite sides of the tower 15. The opposite ends of the manifold 172 are connected to vertically disposed pipes 173, and the pipes 173 are connected to predetermined drying chambers 28 by means of branches 174. The branches 174 have dampers 175 mounted therein for regulating the amount of heated air discharged into the chambers with which the branches 174 are connected. Select ones of the chambers 28 also have gauges 176 of conventional construction mounted thereon, whereby the temperatures of the air within the tower may be determined from the exterior thereof.

In the use and operation of this drier, the moist coffee beans are discharged into the upper hopper 16, and it will be assumed that at the start the upper valve 37, which closes the lower end of the hopper 16, is in closed position, as shown in Figure 4. Valve 156, together with valves 122 and 128, will be opened for permitting the passage of water to tank 127 for initially filling the same and which before filling will be in its uppermost position.

The driving belt 92 will be trained about the idling pulley 93A and when the tank 127 becomes filled, this tank will be lowered thereby moving the belt shifter 94 to shift the belt 92 to the driving pulley 93. Belt 89 will thereby be operated to move wedge carrying belt 73. On the inner run of the belt 73, the wedge 82 will rise on its operative run and move the superposed valve members 96 and 48 respectively to open position in succession, beginning with the valve members at the lower portion of the tower 15. When the wedge passes the rollers 177 connected with valve member 41, this valve member will be moving inwardly to open position, and will be closed by the spring closing means similar to the closing means for valve members 48, shown in Figure 5. There being no beans in the measuring chambers 36, no beans will drop to the uppermost of the chambers 28. After the wedge 82 passes the rollers 177, they will engage rollers 178 connected with the upper valve 37, and beans from hopper 16 will then drop into the measuring chambers 36, valve 41 at this time being closed.

In order to assure that the valve member 37 will be positively moved to a closed position, the valve member 37 has connected therewith a second pair of rollers 179 on the downward run of the wedge belt 73. The wedge belt 73 will continue to rotate progressively charging the drying chambers 28 as the wedge moves upwardly on the inner run thereof.

During the initial charging of the charging chambers 28 the hot air discharged into the lower chamber 17 may be lower in temperature than the normal operating temperature, the temperature of the air being gradually increased until all of the charging chambers are charged.

Assuming that the tower 15 has beans in each drying chamber thereof, and there being beans in the lower chamber 29 and that the beans in chamber 29 are not in their predetermined dried condition, the weight of the beans in chamber 29 will lower the vertically movable chamber wall 100 with the valve member 96 in closed position. The lowering of the wall 100 will rock the balance lever 114 to valve closing position, so that when the wedge 82 moves valve member 48A to open position, the tank 127 will be drained of water, and belt shifter 94 will shift belt 92 to idling pulley 93A stopping movement of the wedge belt 82. The blower 168 operates independently of the movement of the wedge belt so that the hot air will continue to be drawn through chamber 18 and the chambers thereabove, and the heated air discharged into upper chambers 28 from the discharge pipes 173 and branches 174.

As soon as the beans on the lowermost slotted wall 100 are dried to the desired degree, the weight 117 will raise the wall 100 and open valve 122. Tank 127 will then be filled with water and the apparatus will continue in operation intermittently as hereinbefore described. The filling of tank 127 may be timed to the desired degree so as to provide for holding the beans within the several drying chambers for the desired period of time.

By providing a drying tower as hereinbefore described, the hottest air contacts with the beans which are in their driest condition, and the cooler heated air contacts the beans which are gradually being dried. In this manner the hot air will not case-harden the beans as would be the case where the hot air from delivery pipe 165 contacted directly with the beans in their initial moist condition.

This drier will provide for continuous drying of the beans, and provide an improved rapid drying apparatus capable of drying the coffee beans at the desired rapid rate, it being understood that the rate of drying is consistent with the quantity of beans passing through the device. In practice, the delivery chambers 36 are adapted to receive an amount of coffee beans equal to the height of the triangular valve members 48 and 96. By providing for the lateral discharge of the coffee beans from an upper to a succeeding chamber, the beans are agitated and the heavier weight beans may drop through the drier beans for engagement with the perforated walls 45 forming the bottoms of the chambers 28.

Preferably the inclined baffles 47 are alternately arranged so that the beans from one upper chamber will be discharged in one direction to the succeeding chamber and will be discharged from the succeeding chamber to the next lowermost chamber in the opposite direction.

This drier is so construed that the beans will be retained therein until they have been dried to the desired degree, thereby providing for uniform drying of the beans, this uniformity of drying being obtained by the automatic humidity operated balance structure connected with balance lever 114.

During the initial charging of the drying chambers, valve 122 is by-passed, and during each revolution of the wedge belt, valve 48a will effect the emptying of tank 127. The emptying of tank 127 is so timed that before this tank is empty sufficient to provide for shifting of belt 92 to idling pulley 93a, the wedge will have passed the upper measuring valve 38. The filling of tank 127 may be regulated so as to provide the necessary time interval during which there is no movement of the wedge belt and no transfer of the beans from one chamber to another. After the lower wall 100 has received its first charge of imperfectly dried beans, the weight of the beans will cause this wall to be lowered, rocking lever 114 to valve closing position with respect to valve 122, and at this time three-way valve 156 may be moved to automatic position wherein pipe 157 is cut off.

When the beans carried by wall 100 have been dried to the desired degree, weight 117 will raise wall 100, opening valve 122 so as to effect filling of tank 127. When tank 127 is filled it will be lowered and belt 92 will be shifted to pulley 93 and the wedge belt will begin its operating cycle. The dried beans are first discharged from the lower wall 100 which is in raised position, and when the beans from the next chamber are discharged onto lower wall 100, this wall will move down due to the weight of the beans overcoming the weight 117. Continued upward movement of the wedge belt will cause successive discharge of the beans to the chamber therebelow. When the wedge operates valve 48a the float valve in tank 127 will be raised to open position, the wedge belt continuing to move upwardly on its inner run until the uppermost measuring valve has been passed, and at this time tank 127 is filled sufficiently to effect a lowering thereof and shifting of the belt 92 to idling pulley 93a.

With the wedge belt stopped, the hot air will continue to be discharged into the tower until the beans on the lower wall 100 are sufficiently dry to effect raising of this wall from its lower position to its upper position, in which latter position valve 122 is again opened so that tank 127 will again be filled.

What is claimed is:

1. A bean drying device comprising a vertical tower, a plurality of vertically spaced apart slotted walls in said tower dividing the latter into superposed drying chambers, horizontally slidable valve members in each chamber normally closing the slots in said walls, spring means constantly urging said valve members to closed position, an endless belt exteriorly of said tower having the runs thereof vertical, operating means for said belt, means carried by said belt for progressively moving said valve members to open position, and means discharging heated air into said chambers.

2. A bean drying device as set forth in claim 1 wherein said valve member moving means comprises a wedge-shaped element carried by said belt.

3. A bean drying device as set forth in claim 1 which includes timed means for regulating the period of operation of said belt.

4. A drier comprising a tower, a receiving hopper, a predetermined-bulk feed device intermediate the hopper and tower to control the passage of the material to be dried from the receiving hopper to the tower, a delivery hopper at the bottom of the tower, a plurality of vertically spaced apart slotted walls in the tower, all of said walls, except one, being perforated and the lowermost one of said walls being supported for vertical movement, slide valves operatively associated with the walls, means for introducing a drying agent into said tower below the said one wall, actuating means common to said valves and the bulk feed device functioning to effect successively movement of each of said valves and to operate the bulk feed device, and a weighing-scale assembly operatively connected with the said lower-most slotted wall and the aforementioned actuating means and functioning to control operation of said actuating means in response to vertical movement of said lower wall according to the weight of the material thereon.

5. A drying apparatus comprising a plurality of slotted walls located one above the other, means supporting the lower-most one of said walls for vertical movement, slide valves operatively associated with all of the walls, actuating means for the valves functioning to effect successfully movement of each of said valves to open and closed positions, and a weight-equipped balance lever operatively connected with the lower-most wall and the aforementioned actuating means and functioning in response to vertical movement of said lower-most wall according to the weight of the material thereon to cut in and cut out said actuating means.

A. RAUL YGLESIAS-PAZ.

REFERENCES CITED

The following references are of record in the file of this patent:

UNITED STATES PATENTS

| Number | Name | Date |
|---|---|---|
| 626,148 | Dempster | May 30, 1899 |
| 808,081 | French | Dec. 26, 1905 |
| 921,206 | Davidson | May 11, 1909 |
| 1,355,238 | Mangelsdorff | Oct. 12, 1920 |
| 1,673,241 | Hatfield | June 12, 1928 |
| 2,073,553 | Dienst | Mar. 9, 1937 |
| 2,183,274 | Barnsdale | Dec. 12, 1939 |
| 2,317,003 | Vissac | Apr. 20, 1943 |

FOREIGN PATENTS

| Number | Country | Date |
|---|---|---|
| 2,297 | Great Britain | 1896 |
| 15,597 | Great Britain | July 29, 1905 |
| 24,432 | Great Britain | Nov. 3, 1911 |
| 137,631 | Great Britain | Jan. 22, 1920 |
| 379,730 | Germany | Aug. 28, 1923 |
| 562,810 | France | Sept. 15, 1923 |